United States Patent [19]

Suzuki et al.

[11] 4,134,649
[45] Jan. 16, 1979

[54] SOUND MOTION PICTURE CAMERA

[75] Inventors: Takeshi Suzuki, Okazaki; Hiroshi Hirata; Takashi Kondo, both of Sakai, all of Japan

[73] Assignee: Minolta Camera Kabushiki Kaisha, Osaka, Japan

[21] Appl. No.: 777,987

[22] Filed: Mar. 16, 1977

[30] Foreign Application Priority Data

Mar. 26, 1976 [JP] Japan .................................. 51/34010

[51] Int. Cl.² .............................................. G03B 1/60
[52] U.S. Cl. ....................................... 352/27; 352/26; 352/170; 352/172
[58] Field of Search ..................... 352/26, 27, 29, 170, 352/171, 172

[56] References Cited

U.S. PATENT DOCUMENTS 3,776,625  12/1973  Fountain .............................. 352/170

Primary Examiner—Russell E. Adams
Attorney, Agent, or Firm—Wolder, Gross & Yavner

[57] ABSTRACT

A sound motion picture camera having a monitor circuit for applying to an earphone an audio signal which is being recorded on the film is capable of warning of the exhaustion of the film through the earphone. A switch responsive to a mechanism for detecting the exhaustion of the film applies a signal from an oscillator to the earphone, or actuates an oscillator connected to the earphone, to provide the warning when the film has been nearly exhausted or has been completely exhausted. A switching device periodically interrupts the oscillating electric signal so that a warning sound can be heard intermittently through the earphone. A delay circuit interrupts the actuation of the oscillator to cease the oscillating electric signal when a predetermined time has passed after the detection of the exhaustion of the film.

10 Claims, 9 Drawing Figures

SOUND MOTION PICTURE CAMERA

BACKGROUND OF THE INVENTION

The present invention relates generally to an improved sound motion picture camera of the simultaneous recording type wherein the sound which is being recorded on the film is monitored by means of an earphone.

Hithertofore, the method of warning of a photographer of the termination of the camera film at a proper time has been a problem in both sound motion picture cameras and ordinary motion picture cameras. So far, two mechanisms have been proposed: one resorts to the photographer's sight and the other resorts to the photographer's hearing. During the photographing, a photographer tends to concentrate his attention on an object viewed through the viewfinder of the camera so that the photographer is likely to overlook the indication even if an indicating member is provided in the view-finder. Accordingly, a method depending upon the photographer's hearing in which there is caused to occur a change in the camera-driving sounds, or in which there are produced unusual sounds different from the camera driving sounds is employed and provides an improved result, but this method is limited to cameras, such as motion picture cameras using silent films, or sound motion picture cameras, which are equipped with no monitoring device with which an operator can take pictures while listening to sounds being recorded. With a sound motion picture camera in which an operator takes pictures while monitoring the sound through the earphone, the operator's attention, during the photographing, is also directed to the sound from earphone, and as a result, external sounds are often missed or overlooked by the operator. The film termination warning depending on the hearing, accordingly, is not recommended for use in sound motion picture cameras having a sound monitoring device for the above reasons.

SUMMARY OF THE INVENTION

It is, accordingly, a primary object of the present invention to provide a sound motion picture camera, wherein warning sounds are given to an operator through an earphone immediately before or simultaneously with the reaching of the end of the film in the camera thereby positively advising the operator of the termination of the use of the film. The sound motion picture camera of the present invention is characterized in that, there are provided a switch means operable by a detecting means for detecting when the film in the camera has advanced to proximate its end or when the film has been fully consumed or exposed and a warning signal generating circuit connected to an earphone or actuated by means of the aforesaid switch, so that a warning electric signal generated by the warning signal generating circuit is fed to the earphone.

However, with this arrangement, warning sounds which are incessantly produced reach an operator's ears, thus hazarding imparting to the operator an unpleasant feeling.

It is, accordingly, another object of the present invention to provide a sound motion picture camera, wherein an operator is audibly positively advised of the arrival of the end of the film, and the warning sounds are intermittently provided to the operator, so as to relieve the operator of the aforesaid unpleasant feeling. This object is attained by a sound motion picture camera further comprising means adapted to be actuated in association with the operation of the camera drive mechanism or in response to an electrical oscillation for periodically interrupting the warning signal generated by the warning signal generating circuit.

Furthermore, if the warning sounds continue for an excessively long period of time after an operator has been notified of the termination of the film, the operator would likewise experience an unpleasant feeling.

Accordingly, it is a further object of the present invention to provide a sound motion picture camera, wherein an operator is positively warned of the termination of the camera advanced film, and the warning sounds are stopped a predetermined period of time thereafter, so as to relieve the operator of such unpleasant sounds. This object is attained by a sound motion picture camera comprising a delay circuit for interrupting the operation of an oscillating circuit a given period of time after the aforesaid switch means has been operated or actuated by the detecting means.

DESCRIPTION OF THE PREFERRED EMBODIMENTS

Figure 1:
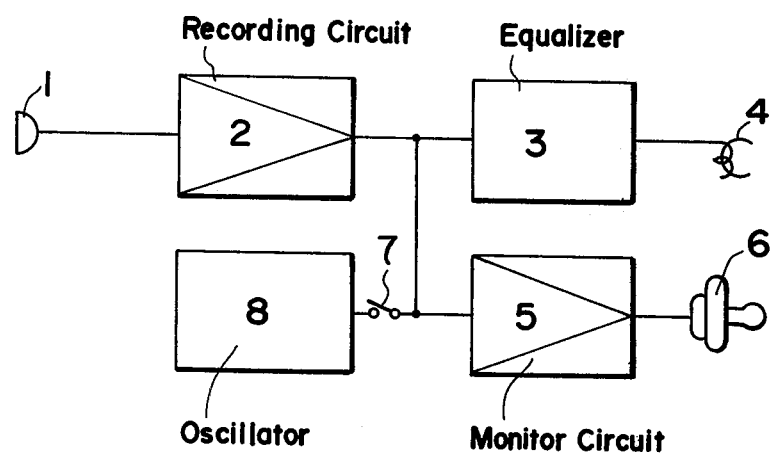
FIG. 1 is a block diagram of an electric circuit of a sound motion picture camera according to a first embodiment of the present invention.
Figure 2:
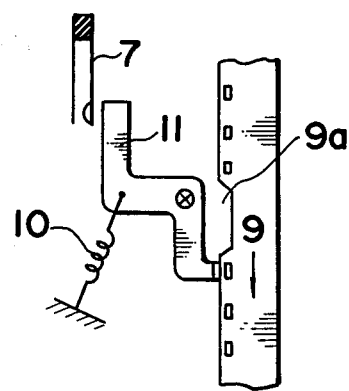
FIG. 2 is a plan view of a detecting mechanism for detecting the exhaustion of the film in the camera.
Figure 3:
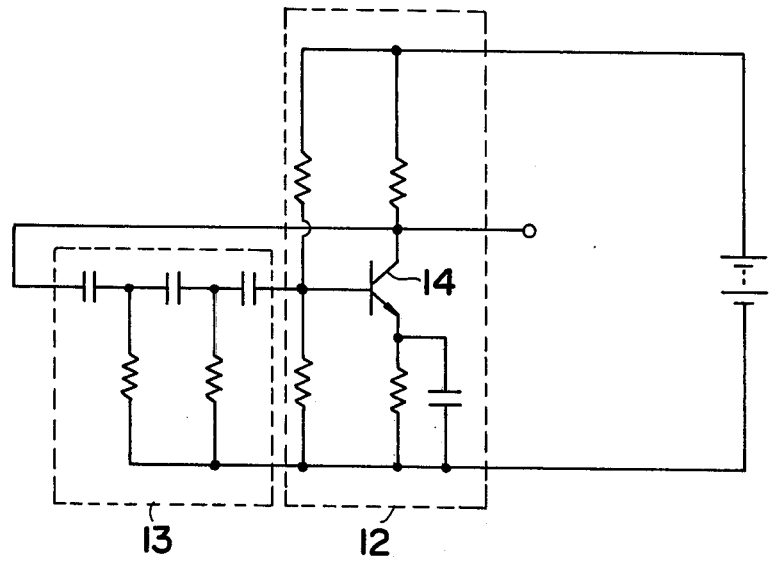
FIG. 3 is a circuit diagram of the oscillator shown in FIG. 1.

Referring now to FIG. 1 which shows a first embodiment of the present invention, a camera sound input transducer input terminal or microphone 1 has an electric sound output signal which is connected to the input of a recording circuit 2 which is connected through an equalizer 3 to the camera sound recording head 4. The sound signal fed as an input to input terminal 1 is amplified by recording circuit 2 and the frequency response is modified by equalizer 3, the modified signal being fed to recording head 4 which records the signal on the advancing film in the known manner. Designated 5 is monitor circuit, whose input is connected to the output of recording circuit 2 so as to feed the audio signal amplified in the recording circuit, to an earphone 6 and an input terminal of the monitor circuit 5 is connected to an oscillator 8 by way of a normally open switch 7. Switch 7, as seen in FIG. 2, is disposed in opposed relation to one arm of a swingable sensing or detecting lever 11 which is resiliently urged by a spring 10 into contact with the longitudinal edge of a camera loaded film 9, so that the switch is brought to its closed position when the other arm of lever 11 is brought into engagement with a cut-out portion or recess 9a provided in the vicinity of the end of the film 9. Oscillator 8 is of known construction and consists of an amplifier circuit 12 and a positive feed-back circuit 13, as seen in FIG. 3, and is so arranged as to oscillate due to the positive feed-back of the output or collector of a transistor 14 to its base.

With the arrangement described above, until detecting lever 11 is brought into engagement with cut-away portion 9a of film 9, only the sound signals amplified by recording circuit 2 are fed from the recording circuit 2 to the monitor circuit 5, so that only the sounds which are being recorded on film 9 are heard through earphone 6 by the operator. When the film 9 comes close to the termination or end thereof and the detecting lever 11 engages cut-out portion 9a of the film 9, then switch 7 is closed and an oscillating electric signal from oscillator 8 is fed to monitor circuit 5, so that warning sounds, together with the sounds which are being recorded on the film, reach the ears of an operator. Since the warning sounds reach through earphone 6 to the ears of an operator, unlike the camera driving sounds or unusual sounds emanating externally of the camera, the operator does not fail to notice the warning sounds, so that the operator is positively advised of the exhaustion of the film.

Figure 4:
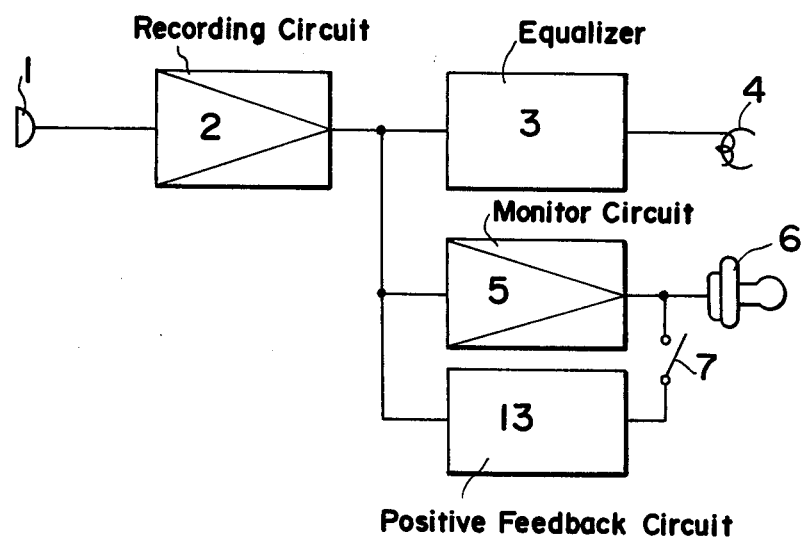
FIG. 4 is a block diagram of an electric circuit of a sound motion picture camera according to a second embodiment of the present invention.

FIG. 4 shows a second embodiment of the present invention, wherein the monitor circuit 5 itself serves an amplifying function, and the amplifier 12 in oscillator 8 is replaced by the monitor circuit 5. In this embodiment, simultaneously with the closure of switch 7, the output of monitor circuit 5 is fed back by way of a positive feedback circuit 13 to the input terminal of monitor circuit 5, whereby the amplifying portion in monitor circuit 5 serves as an oscillator to thereby deliver oscillating electric signal to earphone 6, which produces therefrom an audible warning signal.

Figure 5:
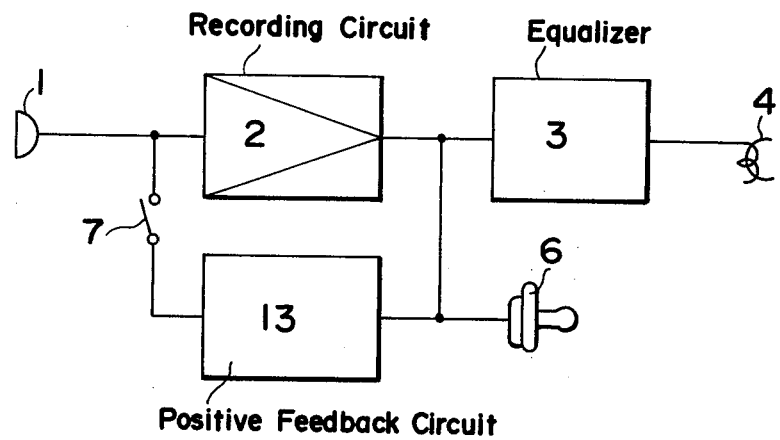
FIG. 5 is a block diagram of an electric circuit of a sound motion picture camera according to a third embodiment of the present invention.

FIG. 5 shows a third embodiment, wherein the present invention is applied to a sound motion picture camera which is equipped with no monitor circuit, so that the amplified sound signals are fed from the recording circuit 2 directly to earphone 6. The oscillator, in this embodiment, consists of recording circuit 2 serving as an amplifier and positive feedback circuit 13 connected between the input and output of recording circuit 2 through sensing switch 7.

Figure 6:
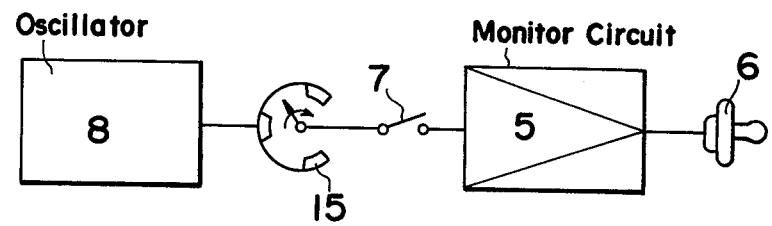
FIGS. 6 and 7 are block diagrams, respectively, of an essential part of an electric circuit of a sound motion picture camera according to a fourth and fifth embodiment of the present invention.

FIG. 6 shows a fourth embodiment of the present invention, wherein a switch 15 adapted to open or close in response to the drive of a camera is connected in series with switch 7 between oscillator 8 and monitor circuit 5. Switch 15 includes a rotor rotating in association with the running of the camera, and stators arranged at a predetermined spacing from one another along the locus of the rotor. The switch 15 is adapted to be turned on and off with a period longer than that of the oscillation of the warning signal oscillator 8. When the switch 7 is closed upon the termination of the use of a film, the warning signal is fed to monitor circuit 5 only when switch 15 is closed, so that sounds intermittently reach through earphone 6 to the ears of an operator for a long time duration. With this arrangement, there is eliminated any unpleasant feeling due to a continuous warning sound.

A film cartridge which is available on the market is so designed that when a whole roll of film has been taken up on the film take-up spool, then the spool is stopped. If switch 15 is provided in a camera employing such a cartridge, with its rotor mounted on the film-up spool of the camera, which spool is in frictional engagement with the spool of the cartridge, then the switch 15 is opened or closed simultaneously at the termination of the use of a film and so remains, so that the warning sounds no longer reach the ears of the operator, or continuously reach the ears of the operator. Thus, the operator can discriminate between the approach of a film to its termination and the complete termination of the use of a film.

Figure 7:
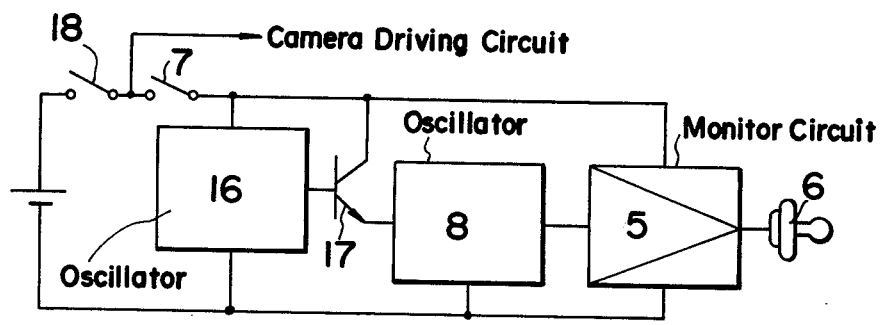

FIG. 7 shows a fifth embodiment of the present invention, wherein switch 15 used in the embodiment shown in FIG. 6 is replaced by a second oscillator 16 and a transistor 17, and switch 7 and transistor 17 are used as a potential source switch means for oscillator 8. The output of oscillator 16 oscillates with a period longer than that of the output of oscillator 8, so as to render transistor 17 conductive intermittently. As a result, power is fed to oscillator 8 according to the period of oscillation of the output of oscillator 16, so that the warning sounds due to oscillator 8 will be heard through earphone 6 by an operator for an extended duration of time. In FIG. 7, shown at 18, is release switch. When release switch 18 is closed by depressing a release button (not shown), the camera starts operating for photographing.

Figure 8:
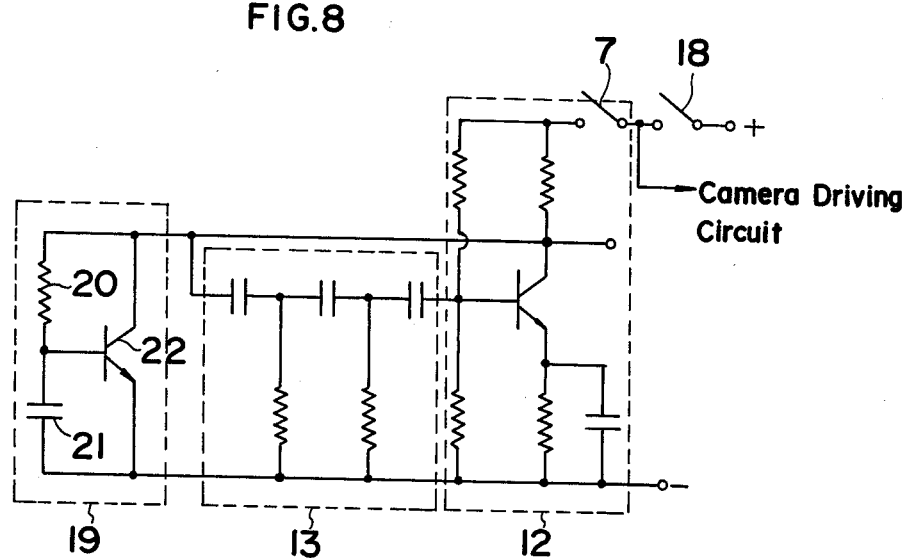
FIG. 8 is a diagram of an essential part of an electric circuit of a sound motion picture camera according to a sixth embodiment of the present invention.

FIG. 8 illustrates a sixth embodiment of the present invention, in which the warning sounds are discontinued after the termination of the use of a film in the case where a film cartridge is equipped with no device for detecting the stoppage of the film take-up spool so as to discontinue the oscillation, by providing a delay circuit 19 for discontinuing the operation of the oscillator a given period of time after the closure of switch 7. Delay circuit 19 consists of resistor 20 and capacitor 21 which are connected in series relation to each other. Transistor 22 has a base connected to the junction between resistor 20 and capacitor 21. When switch 7 is closed, capacitor 21 is gradually charged according to the time constant of the delay circuit, and a given time thereafter, transistor 22 is rendered conductive. Since transistor 22 becomes conductive, positive feedback circuit 13 is short-circuited, whereby the oscillator consisting of positive feedback circuit 13 and amplifying circuit 12 stops, thereby discontinuing the warning sounds which have been heard through the earphone by the operator. Thus, there is eliminated the unpleasant feeling resulting from warning sounds given for an excessively long time.

Moreover, when the release button is depressed without loading a film in a camera, the switch 7 is closed in a like manner to the case where the film has been used up, and warning sounds are heard through an earphone by an operator. For example, when one who wants to buy a camera operates the desired camera for a trial for checking the camera in the shop, if such warning sounds are heard by him or her during checking, he or she might have an unpleasant feeling. However, in the last embodiment, such warning sounds stop after a given period of time, so that the sounds by no means impart any unpleasant feeling to one who wants to buy a camera.

Figure 9:
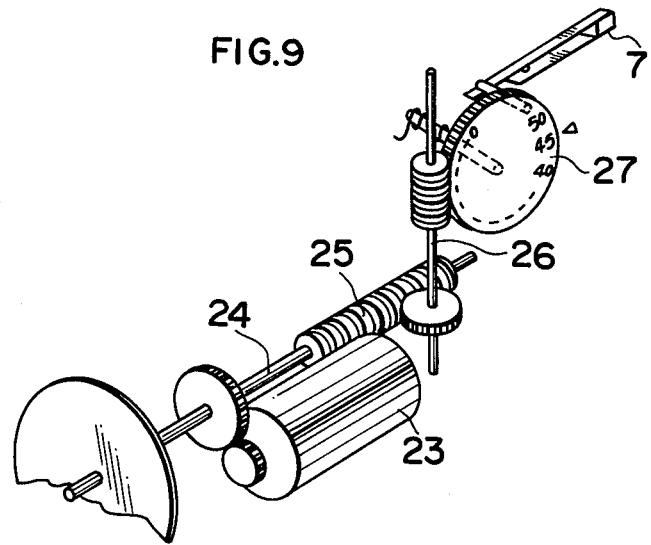
FIG. 9 is a perspective view of a camera driving mechanism and another detecting mechanism for detecting exhaustion of a film.

The embodiments described above should not be construed in a limitative sense. The oscillators shown may take various forms other than those shown in FIGS. 3 and 8. Although in the embodiments shown, switch 7 is so arranged as to close immediately before a film has been used up, the timing of closure of the switch may be brought in coincidence with the termination of the use of a film. In the embodiment shown in FIG. 6 which is so arranged that, by the detection of stoppage of a film take-up spool in a film cartridge, an operator can discriminate between the fact that a film is just prior to the termination and the fact that a film has been just used up, it is mandatory to close switch 7 immediately before a film has been used up. A mechanism for actuating switch 7 may be of the type using a film counter as shown in FIG. 9. Referring to FIG. 9, shown at 23 is a drive motor, at 24 a drive shaft adapted to be rotated with rotation of the motor, at 25 a worm gear, at 26 a rotary shaft, and at 27 a counter gear adapted to rotate with rotation of the rotary shaft. An insulating pin 28 provided on counter gear 27 closes switch 7 normally open immediately before or simultaneously with the termination of the use of the film.

We claim:

1. A sound motion picture camera for use with a sound film and for the recording of sound simultaneously with the photographing of an object, comprising:
   means for recording an electric sound signal representative of said sound on said film;
   an earphone;
   means for applying a monitoring signal representative of said sound to said earphone;
   means for generating an electric warning signal;
   means for detecting exhaustion of said film due to the transportation thereof for photographing;
   switching means responsive to said detecting means for applying said electric warning signal to said earphone upon detection of the exhaustion of said film by said detecting means;
   means for driving said camera for photographing; and means for periodically interrupting said electric warning signal in response to the driving of said camera.

2. A sound motion picture camera as defined in claim 1, wherein said generating means is connected to said earphone through said switching means and said applying means, whereby said switching means applies said electric warning signal to said earphone through said applying means.

3. A sound motion picture camera as defined in claim 1, wherein said generating means includes an oscillator for generating an electric signal oscillating with a predetermined period, said oscillating electric signal being said electric warning signal.

4. A sound motion picture camera as defined in claim 1, wherein said generating means includes an oscillator for generating an electric signal oscillating with a predetermined period, and wherein said interrupting means includes a switch actuated by said driving means with a period longer than that of said oscillating electric signal and connected to said oscillator in series with said switching means, said oscillating electric signal being said electric warning signal.

5. A sound motion picture camera as defined in claim 1, wherein said detecting means includes a member interconnected with said switching means to actuate said switching means when said film has been nearly completely exhausted.

6. A sound motion picture camera as defined in claim 1, wherein said detecting means includes a member interconnected with said switching means to actuate said switching means when said film has been completely exhausted.

7. A sound motion picture camera for use with a sound film and for recording of a sound simultaneously with the photographing of an object, comprising:
   means for recording an electric sound signal representative of said sound on said film;
   an earphone;
   means for applying a monitoring signal representative of said sound to said earphone;
   a first oscillator for generating an electric signal oscillating with a predetermined period, said first oscillator being connected to said earphone to apply said electric signal to said earphone;
   means for detecting the exhaustion of said film due to the transportation thereof for the photographing;
   a power source; and
   switching means responsive to said detecting means for actuating said first oscillator upon detection of the exhaustion of said film by said detecting means, said switching means including a semi-conductive switching circuit for supplying an electric power to said first oscillator from said power source, a second oscillator for generating an electric signal oscillating with a predetermined period longer than that of the oscillating signal generated by said first oscillator, and a switch actuated by said detecting means upon the detection of the exhaustion of the film for actuating said second oscillator, said second oscillator being connected to said semi-conductive switching circuit so as to periodically render the same conductive and non-conductive in accordance with said oscillating signal generated thereby, whereby said electric power is periodically supplied to said first oscillator.

8. A sound motion picture camera as defined in claim 7, wherein said detecting means includes a member interconnected with said switch to actuate said switch when said film has been nearly completely exhausted.

9. A sound motion picture camera as defined in claim 7, wherein said detecting means includes a member interconnected with said switch to actuate said switch when said film has been completely exhausted.

10. A motion picture camera for use with a sound film and for recording of a sound simultaneously with the photographing of an object, comprising:
    means for recording an electric sound signal representative of said sound on said film;
    an earphone;
    means for applying a monitoring signal representative of said sound to said earphone;
    means for generating an electric warning signal, said generating means being connected to said earphone to apply said electric warning signal to said earphone;
    means for detecting the exhaustion of said film due to the transportation thereof for the photographing;
    switching means responsive to said detecting means for actuating said generating means upon detection of the exhaustion of said film by said detecting means; and
    a delay circuit for interrupting the actuation of said generating means when a predetermined time has passed after the detection of the exhaustion of said film by said detecting means.

* * * * *